United States Patent
Ohta et al.

(10) Patent No.: US 7,348,698 B2
(45) Date of Patent: Mar. 25, 2008

(54) ACTUATOR FOR OPERATING A TRANSMISSION CONTROL VALVE OF AN AUTOMATIC TRANSMISSION APPARATUS

(75) Inventors: Hirohisa Ohta, Tokyo (JP); Satoru Tokiya, Tokyo (JP); Masayasu Miyajima, Tokyo (JP); Shuzo Isozumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 514 days.

(21) Appl. No.: 10/679,375

(22) Filed: Oct. 7, 2003

(65) Prior Publication Data

US 2004/0070295 A1    Apr. 15, 2004

(30) Foreign Application Priority Data

Oct. 11, 2002    (JP)    ............... 2002-298474

(51) Int. Cl.
  *H02K 7/06*    (2006.01)
  *H02K 37/00*    (2006.01)
  *H02K 37/24*    (2006.01)

(52) U.S. Cl. ...................... 310/80; 310/49 R

(58) Field of Classification Search ............. 74/89.34, 74/25, 89.4, 89.26; 474/29, 26, 40, 31, 8, 474/18; 310/49 R, 12, 80
See application file for complete search history.

(56) References Cited

U.S. PATENT DOCUMENTS

| | | | |
|---|---|---|---|
| 3,639,791 A * | 2/1972 | Jenkin | ................. 310/90 |
| 4,764,696 A * | 8/1988 | Fukaya et al. | ............. 310/49 R |
| 5,015,903 A * | 5/1991 | Hancock et al. | ............. 310/168 |
| 6,711,963 B2* | 3/2004 | Yabe | .......................... 74/89.44 |
| 6,857,332 B2* | 2/2005 | Pfister | ....................... 74/89.34 |
| 6,927,507 B2* | 8/2005 | Hashimoto et al. | ........... 310/45 |
| 2002/0063492 A1* | 5/2002 | Scott | ............................ 310/261 |
| 2002/0161503 A1* | 10/2002 | Joe et al. | ........................ 701/51 |
| 2003/0121414 A1* | 7/2003 | Cautenet et al. | .............. 92/140 |

FOREIGN PATENT DOCUMENTS

| | | |
|---|---|---|
| JP | 8-49782 A | 2/1996 |
| JP | 9-292047 A | 11/1997 |
| JP | 11-218218 A | 8/1998 |
| JP | 11-218218 A | 8/1999 |
| JP | 11-315948 A | 11/1999 |

* cited by examiner

*Primary Examiner*—Richard Ridley
*Assistant Examiner*—Terence Boes
(74) *Attorney, Agent, or Firm*—Sughrue Mion, PLLC

(57) ABSTRACT

A rotor having magnets composed of rare-earth magnets is rotatably disposed inside an exterior casing, a penetrating aperture is disposed through a first end of the exterior casing relative to a direction of a motor central axis, and a filter is disposed so as to cover the penetrating aperture from a second end of the exterior casing relative to the direction of the motor central axis. A shaft is mounted to a bush by screwing an external thread portion into an internal thread portion. An operating member is mounted integrally onto a second end portion of the shaft projecting outward from a penetrating aperture in a housing. A rotation-regulating projection portion of a guide member fixed to the shaft is fitted loosely into a guide groove disposed so as to extend along an inner wall surface of a central aperture of the housing in the direction of the motor central axis.

5 Claims, 2 Drawing Sheets

ACTUATOR FOR OPERATING A TRANSMISSION CONTROL VALVE OF AN AUTOMATIC TRANSMISSION APPARATUS

BACKGROUND OF THE INVENTION

1. Field of the Invention

The present invention relates to an automatic transmission apparatus transmission control valve operating actuator disposed in an automatic transmission apparatus of an automobile to operate a transmission control valve for controlling a transmission mechanism.

2. Description of the Related Art

Conventionally, in automatic transmission apparatuses in automobiles, particularly in continuously variable transmission control apparatuses, a rotational velocity ratio between an engine shaft and a drive shaft is adjusted by changing a diameter ratio between a main pulley and an auxiliary pulley linked by a metal belt. The diameters of the main pulley and the auxiliary pulley are varied continuously by changing a width of a belt groove on each of the pulleys. The widths of these belt grooves are varied by moving a drum disposed on each of the pulleys. Each of the drums is moved by a hydraulic circuit, a transmission control valve for controlling the amount of that movement being operated by an actuator.

A conventional actuator is provided with: a stepping motor having an exterior casing made of a resin, a motor main body disposed inside the exterior casing, and a shaft rotated by the motor main body; a housing made of a resin coupled to the exterior casing; a pipe for operating a transmission control valve by reciprocating in an axial direction relative to the shaft, a base end portion of the pipe being positioned inside the housing and a tip portion of the pipe being disposed so to project outward from the housing; and a power conversion mechanism for converting rotation of the shaft into rectilinear motion of the pipe.

In this conventional actuator, a pressure difference arises between an internal portion and an external portion of the housing as a result of the reciprocating motion of the pipe. Thus, a communicating aperture communicating between the internal portion and the external portion of the housing is disposed through a side wall of the housing to alleviate the pressure difference between the internal portion and the external portion of the housing arising as a result of the reciprocating motion of the pipe and allow the pipe to move smoothly. Furthermore, a filter is disposed in the communicating aperture to prevent contaminants in the oil from entering the housing through the communicating aperture. (See Patent Literature 1, for example.) Patent Literature 1: Japanese Patent Laid-Open No. HEI 11-218218 (Gazette: paragraph 0024; Claims; FIG. 2)

In conventional actuators, one problem has been that a process is required for affixing the filter by adhesive to the communicating aperture disposed in the housing, increasing the number of manufacturing processes, thereby preventing cost reductions.

In conventional actuators, because ferrite magnets are used for magnets therein, another problem has been that reductions in the size and weight of the magnets is not possible, reducing productivity, thereby preventing cost reductions.

SUMMARY OF THE INVENTION

The present invention aims to solve the above problems and an object of the present invention is to provide a low-cost actuator for operating a transmission control valve of an automatic transmission apparatus enabling simplification of a manufacturing process by constructing a shaft disposed at a central axial position of a motor so as to be reciprocated in an axial direction by rotation of a rotor and forming a volume changing portion arising as a result of the reciprocating motion of the shaft inside the rotor so as to enable a filter to be secured simultaneously during a process of installing the rotor.

Another object of the present invention is to provide a low-cost actuator for operating a transmission control valve of an automatic transmission apparatus enabling reductions in size and weight of magnets by using rare-earth magnets for the magnets.

According to one aspect of the present invention, an actuator for operating a transmission control valve of an automatic transmission apparatus includes a stepping motor having an exterior casing having a first end and a second end relative to a motor central axis; a motor main body composed of a stator disposed inside the exterior casing; and a rotor rotatably disposed inside the stator around the motor central axis, the rotor being constructed by mounting magnets constituting magnetic poles to an outer circumferential surface of a cylindrical bush; and a shaft having a first end and a second end, the shaft being disposed such that the second end thereof projects outward from the exterior casing at a position of the motor central axis. In addition, there is also provided a housing linked to the second end of the exterior casing relative to the motor central axis, the housing accommodating a projecting portion of the shaft; a power conversion mechanism for converting torque acting around the motor central axis of the rotor into a motive force in a direction along the motor central axis; and an operating member disposed outside the housing in the direction along the motor central axis, the operating member being moved in the direction along the motor central axis by the motive force in the direction along the motor central axis to operate the transmission control valve. The magnets are prepared using rare-earth magnets.

Therefore, an actuator for operating a transmission control valve of an automatic transmission apparatus enabling reductions in the size and weight of a motor main body is provided.

According to another aspect of the present invention, an automatic transmission apparatus transmission control valve operating actuator includes a stepping motor having an exterior casing having a first end and a second end relative to a motor central axis; a motor main body composed of a stator disposed inside the exterior casing; and a rotor rotatably disposed inside the stator around the motor central axis, the rotor being constructed by mounting magnets constituting magnetic poles to an outer circumferential surface of a cylindrical bush, and an internal thread portion being formed on an inner peripheral wall surface of the bush; and a shaft having a first end and a second end, the shaft being disposed such that the second end thereof projects outward from the exterior casing at a position of the motor central axis by screwing an external thread portion formed on the first end of the shaft into the internal thread portion of the bush. In addition, there is also provided a housing linked to the second end of the exterior casing relative to the motor central axis, the second end of the shaft projecting outward along the direction of the motor central axis away from the housing; a power conversion mechanism for converting torque acting around the motor central axis of the rotor into a motive force in a direction along the motor central axis by regulating rotation of the shaft so as to move the shaft in the direction along the motor central axis; and an operating member mounted to a second end portion of the shaft projecting outward from the housing, the operating member being moved in the direction along the motor central axis to operate the transmission control valve. A penetrating aperture is disposed through the first end of the exterior casing relative to the direction of the motor central axis so as to communicate between an interior portion of the bush and an exterior portion of the exterior casing, and a filter is disposed so as to cover the penetrating aperture from the second end of the exterior casing relative to the direction of the motor central axis.

Therefore, an inexpensive actuator for operating a transmission control valve of an automatic transmission apparatus is provided in which the direction from which the filter, a shaft, a rotor, and a housing are mounted is aligned with the direction of the motor central axis, improving assembly.

DETAILED DESCRIPTION OF THE PREFERRED EMBODIMENTS

Preferred embodiments of the present invention will now be explained with reference to the drawings.

Embodiment 1

Figure 1:
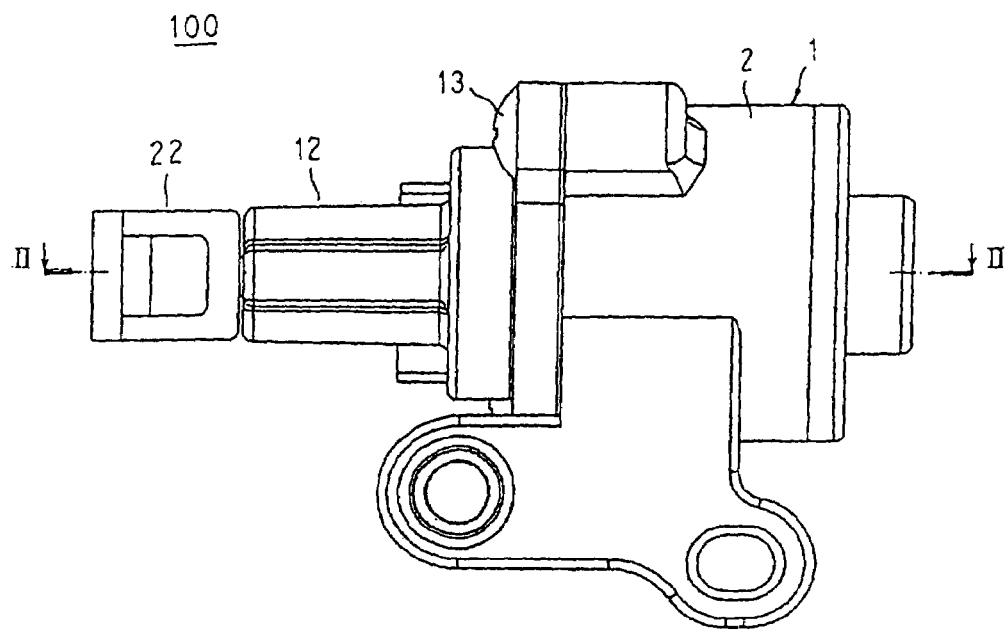
FIG. 1 is a plan showing a transmission control valve operating actuator according to Embodiment 1 of the present invention.
Figure 2:
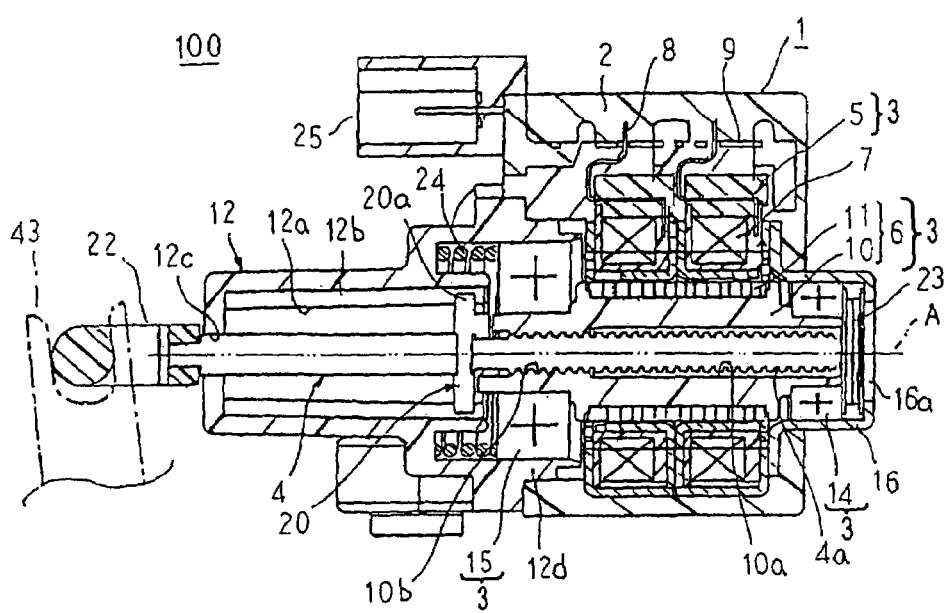
FIG. 2 is a cross section taken along line II-II in FIG. 1 viewed from the direction of the arrows.
Figure 3:
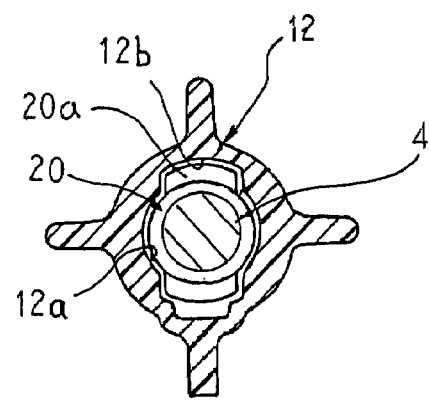
FIG. 3 is a cross section showing part of the transmission control valve operating actuator in FIG. 1.

FIG. 1 is a plan showing a transmission control valve operating actuator according to Embodiment 1 of the present invention, FIG. 2 is a cross section taken along line II-II in FIG. 1 viewed from the direction of the arrows, and FIG. 3 is a cross section showing part of the transmission control valve operating actuator in FIG. 1. Moreover, in FIG. 2, A indicates a motor central axis.

In FIGS. 1 and 2, an actuator 100 for operating a transmission control valve of an automatic transmission apparatus is provided with: a permanent-magnet stepping motor 1 having an exterior casing 2 made of a resin, a motor main body 3 disposed inside the exterior casing 2, and a shaft 4 reciprocated in a direction of a motor central axis A by the motor main body 3; an operating member 22 made of a resin disposed so as to be able to reciprocate in an axial direction relative to the shaft 4 (corresponding to the direction of the motor central axis A); and a power conversion mechanism for converting torque from the motor main body 3 into a reciprocating force in an axial direction relative to the shaft 4.

The motor main body 3 has: a stator 5 fixed inside the exterior casing 2; and a rotor 6 rotatably supported by means of first and second bearings 14 and 15.

The stator 5 has: a coil 7; coil terminals 8 leading out from the coil 7; and connector terminals 9 connected to the coil terminals 8. The connector terminals 9 are connected to an external connector 25.

The rotor 6 is provided with: a hollow cylindrical bush 10; and magnets 11 affixed using an adhesive to an outer circumferential surface of the bush 10 in a cylindrical shape, the magnets being magnetized such that North-seeking (N) poles and South-seeking (S) poles alternate in a circumferential direction. A first end of the bush 10 is supported by means of the first bearing 14 in a cover 16 insert-molded into the exterior casing 2, a second end being supported by means of the second bearing 15 in a flange portion 12*d* of a housing 12 described below, the magnets 11 rotating on an inner circumferential side of (i.e., radially inside) the stator 5. An internal thread portion 10*b* is formed in a bush central aperture 10*a* disposed through the bush 10 at a position of a central axis of the bush 10. The shaft 4 is mounted to the bush 10 such that an external thread portion 4*a* formed on a first end of the shaft 4 is screwed into the internal thread portion 10*b* and a second end of the shaft 4 projects outward from the bush 10. Moreover, rare-earth magnets having a low demagnetizing factor at high temperatures and a high magnetic flux, such as samarium-cobalt magnets, for example, are used for the magnets 11.

The housing 12 is a cylindrical cup-shaped body made of a resin having a housing central aperture 12*a*. Guide grooves 12*b*, as shown in FIGS. 2 and 3, are recessed into inner wall surfaces of the housing central aperture 12*a* so as to have a groove direction aligned with a direction of an aperture center of the housing central aperture 12*a*. A housing penetrating aperture 12*c* is disposed through an end of the housing 12 at a central position so as to communicate between the housing central aperture 12*a* and an external portion. The housing 12 constructed in this manner is securely fastened to a second end of the exterior casing 2 relative to a direction of the motor central axis A by a plurality of screws 13 extending parallel to the shaft 4 such that the aperture center of the housing central aperture 12*a* is aligned with the central axis of the bush 10 (the motor central axis A). Thus, a portion of the shaft 4 projecting outward from the bush 10 passes through the housing central aperture 12*a* and projects outward through the housing penetrating aperture 12*c*. The operating member 22 is mounted to a tip portion of the shaft 4 projecting out through the housing penetrating aperture 12*c*. The operating member 22 is engaged in a rotatable lever 43 that is linked to a transmission control valve (not shown).

A guide member 20 is fixed to the portion of the shaft 4 projecting outward from the bush 10 so as to be disposed inside the central aperture 12*a* of the housing 12. Radially-projecting rotation-regulating projection portions 20*a* are formed on outer circumferential portions of the guide member 20, fitting loosely into the guide grooves 12*b*, as shown in FIGS. 2 and 3. Moreover, the guide member 20 and the guide grooves 12*b* constitute a power conversion mechanism.

The cover 16 is prepared by forming a metal plate into a cylindrical cup shape, a cover penetrating aperture 16*a* being disposed through a bottom surface thereof. The cover 16 is insert-molded into the exterior casing 2 such that the cover penetrating aperture 16*a* is positioned at a first end of the rotor 6 relative to the direction of the motor central axis A.

A method for assembling the actuator 100 will now be explained.

First, the stator 5 and the external connector 25 are prepared integrally with the exterior casing 2 by molding in a resin. The shaft 4, mounted with the guide member 20, is inserted inside the housing central aperture 12*a* such that the rotation-regulating projection portions 20*a* enter the guide grooves 12*b* of the central aperture 12*a* of the housing 12, an end of the shaft 4 projecting out through the housing penetrating aperture 12c. Then, with the shaft 4, etc., in this state, the operating member 22 is molded integrally onto the end of the shaft 4 projecting outward from the penetrating aperture 12c of the housing 12 by injection molding.

Next, the first and second bearings 14 and 15 are mounted to first and second end portions of the bush 10. Then, a spring member 24 is mounted to the flange portion 12d of the housing 12, and thereafter the rotor 6 is mounted to the shaft 4 by screwing the external thread portion 4a of the shaft 4 into the internal thread portion 10b of the bush 10.

Next, a filter 23 is inserted inside the stator 5, which is fixed to the exterior casing 2, from the second end relative to the direction of the motor central axis A. Thus, the filter 23 is disposed inside the cover 16, which is insert-molded into the exterior casing 2. Thereafter, the rotor 6 mounted to the first end of the shaft 4 is inserted into the stator 5 from the second end relative to the direction of the motor central axis A. Thus, the first bearing 14 is inserted into the cover 16, the filter 23 being pressed by the first bearing 14 and placed in close contact with a bottom surface of the cover 16. Then, the housing 12 is placed in contact with the exterior casing 2 while compressing the spring member 24 and the housing 12 is securely fastened to the exterior casing 2 by the screws 13 to complete assembly of the actuator 100. At this time, resilient force from the spring member 24 acts so as to press the second bearing 15 toward the cover 16, the filter 23 being held and secured between the first bearing 14 and the bottom surface of the cover 16, and the cover penetrating aperture 16a being covered by the filter 23.

Figure 4:
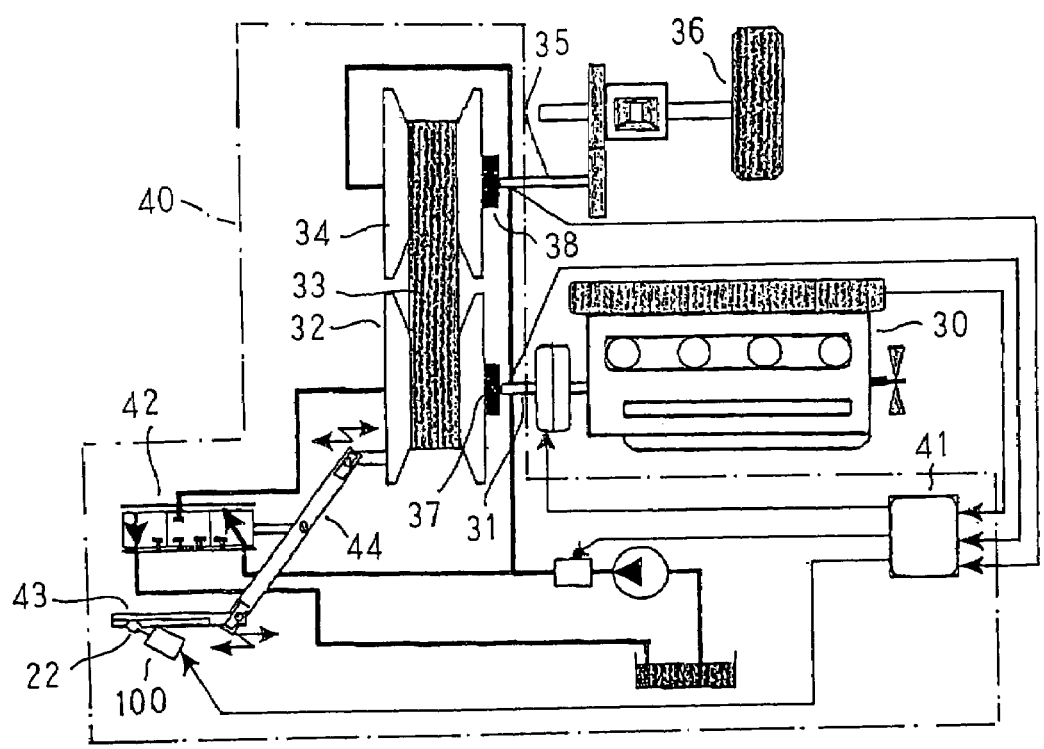
FIG. 4 is a schematic diagram explaining operation of an automatic transmission apparatus using the actuator according to the present invention.

Next, operation of the actuator 100 will be explained. Moreover, the actuator 100, as shown in FIG. 4, is installed inside a transmission case (not shown) for accommodating a transmission mechanism and a transmission control valve 42 for controlling the transmission mechanism, and is activated and controlled by an automatic transmission apparatus 40. The operating member 22 mounted to the end of the shaft 4 of the actuator 100 engages with the lever 43, which opens and closes the transmission control valve 42.

First, an automotive vehicle is moved by transferring rotational torque from an engine 30 to a wheel 36 by means of an engine shaft 31, a main pulley 32, a metal belt 33, an auxiliary pulley 34, and a drive shaft 35.

Next, when electric power is supplied to the coils 7 by means of the external connector 25, the coil 7 is excited, rotating the rotor 6. Then, because the internal thread portion 10b of the bush 10 of the rotor 6 and the external thread portion 4a of the shaft 4 are screwed together, the shaft 4 starts to turn together with the rotor 6. Here, because the rotation-regulating projection portions 20a of the guide member 20 are engaged in the guide grooves 12b of the housing central aperture 12a, rotational torque transferred from the rotor 6 to the shaft 4 is received by the guide grooves 12b by means of the rotation-regulating projection portions 20a, preventing the shaft 4 from rotating. Thus, the torque from the rotor 6 is converted to a motive force along an axial direction relative to the shaft 4. As a result, the rotation-regulating projection portions 20a are guided by the guide grooves 12b and move in the groove direction inside the guide grooves 12b, and the shaft 4 moves rectilinearly along the direction of the motor central axis A. The shaft 4 is moved in a reverse direction relative to the motor central axis A by changing the polarity of the electric power supplied to the coil 7 by means of the external connector 25.

The lever 43 is operated by the reciprocating motion of the operating member 22. The force operating on the lever 43 is transferred to the transmission control valve 42 by means of a link 44 to open and close the transmission control valve 42. Supply and return of oil to and from the main pulley 32 is performed by the opening and closing of the transmission control valve 42, thereby moving a drum (not shown) disposed on the main pulley 32 to adjust a belt groove width of the main pulley 32. Thus, a diameter ratio between the main pulley 32 and the auxiliary pulley 34 linked by the metal belt 33 is changed, adjusting a rotational velocity ratio between the engine shaft 31 and the drive shaft 35.

Thus, a control portion 41 of the automatic transmission apparatus 40 controls the amount of electric power supplied to the coil 7 based on detection signals of the rotational speeds of the engine shaft 31 and the drive shaft 35 from velocity sensors 37 and 38 to adjust the rotational velocity ratio between the engine shaft 31 and the drive shaft 35.

In this actuator 100, the volume of space between the central aperture 10a of the bush 10 and the shaft 4 changes as a result of the reciprocating motion of the shaft 4. Oil inside the transmission case enters and leaves this space through the penetrating aperture 16a of the cover 16 as the volume of this space changes, alleviating pressure differences between the internal portion and the external portion of the actuator 100 arising as a result of the reciprocating motion of the shaft 4. Here, contaminants in the oil are prevented by the filter 23 from entering the space through the cover penetrating aperture 16a. Thus, the reciprocating motion of the shaft 4, and hence the opening and closing operation of the transmission control valve 42, is performed smoothly.

According to Embodiment 1, because samarium-cobalt magnets are used for the magnets 11, if the number of windings in the coil 7 is identical, the volume and weight of the magnets 11 required to generate equivalent torque can be reduced compared to the ferrite magnets often used conventionally. As a result, because the motor main body 3 can be reduced in size and weight, a compact, light-weight actuator 100 can be achieved, enabling cost reductions to be achieved. Cost reductions are also enabled because the size of the magnets 11 can be reduced. In addition, because the rotor 6 can be reduced in size and weight, installation of the rotor 6 is improved, improving assembly of the actuator.

Furthermore, if the number of windings in the coil 7 is identical, because the excitation current flowing to the coil 7 required in order to generate an equivalent torque can also be reduced compared to the conventional examples using ferrite magnets, the consumed electric current is reduced. As a result, electric power consumption by a control unit can be reduced and the amount of heat generated by the coil 7 itself decreases, thereby improving heat-resistance reliability. In addition, the automatic transmission apparatus is maintained at high temperatures during operation, but because the amount of heat generated by the coil 7 itself is small, quality reliability relating to heat tolerance of the members in a vicinity of the coil 7 rises, reducing the probability of the occurrence of short circuits, wire breakages, etc., in the coil 7.

In the conventional example, because the shaft is press-fitted into the bush and then the magnets are affixed to an outer periphery of the bush using an adhesive, the shaft projecting outward from the bush is a hindrance, leading to deterioration in workability when affixing the magnets. Furthermore, there has been a danger that stress will arise in the bush due to the press-fitting of the shaft, reducing the durability of the bush.

In Embodiment 1, because the rotor 6 and the shaft 4 are constituted by separate parts, the magnets 11 are affixed to an outer circumferential surface of the bush 10, which is a separate part, improving workability when affixing the magnets. Furthermore, because the shaft 4 is mounted by being screwed into the bush 10, stresses which might otherwise reduce the durability of the bush 10 do not occur in the bush 10 while the shaft 4 is being mounted to the bush 10.

Because the rotation-regulating projection portions 20a are formed on the guide member 20 fixed to the shaft 4, and the guide grooves 12b are disposed so as to extend along the inner wall surfaces of the central aperture 12a of the housing 12 such that the groove direction is aligned with the direction of the motor central axis A, and the rotation-regulating projection portions 20a are inserted loosely in the guide grooves 12b, the torque from the rotor 6 transmitted to the shaft 4 by means of the intermeshed portion between the internal thread portion 10b and the external thread portion 4a is received in the guide grooves 12b by means of the rotation-regulating projection portions 20a and is converted to a motive force in the direction of the motor central axis A. Thus, a power conversion mechanism can be achieved by a simple construction, enabling cost reductions.

Because the cover penetrating aperture 16a is disposed through the first end of the exterior casing 2 in the direction of the motor central axis A so as to communicate between an interior portion of the rotor 6 and an exterior portion of the exterior casing 2, pressure differences between the internal portion and the external portion of the actuator 100 arising as a result of the reciprocating motion of the shaft 4 are alleviated by oil entering and leaving through the cover penetrating aperture 16a, enabling the reciprocation of the shaft 4 to be performed smoothly. Because the filter 23 is disposed so as to cover the cover penetrating aperture 16a, contaminants in the oil are prevented from entering the motor main body 3, also enabling the reciprocation of the shaft 4 to be performed smoothly.

Because the cover penetrating aperture 16a is disposed through the first end of the exterior casing 2 relative to the direction of the motor central axis A, and the filter 23 is disposed so as to cover the cover penetrating aperture 16a from the second end relative to the direction of the motor central axis A, and the rotor 6 with the shaft 4 installed is inserted from the second end relative to the direction of the motor central axis A inside the stator 5 fixed inside the exterior casing 2, and in addition, the housing 12 is mounted to the exterior casing 2 from the second end relative to the direction of the motor central axis A, the direction from which the filter 23, the shaft 4, the rotor 6, and the housing 12 are mounted is a single direction, namely the direction of the motor central axis A, improving workability when assembling the actuator.

Because the filter 23 is mounted so as to be held between the first bearing 14 and the bottom surface of the cover 16, a means such as adhesive, etc., for securing the filter 23 is no longer necessary, enabling cost reductions. In addition, because the spring member 24 is disposed in a compressed state between the flange portion 12d of the housing 12 and the second bearing 15 that rotatably supports the bush 10, the force of the spring member 24 acts on the first bearing 14 though the second bearing 15 and the bush 10, stably ensuring the securing force acting on the filter 23 for a long time.

Because the operating member 22 is formed integrally on a second end portion of the shaft 4 by injection molding with the shaft 4 installed in the housing 12 such that the second end of the shaft 4 projects outward from the penetrating aperture 12c of the housing 12, the number of parts is reduced, improving workability when assembling the actuator.

Now, the actuator 100 is installed inside a transmission (T/M) and, for example, is used at a temperature range of between −40 degrees Celsius and 150 degrees Celsius. Rare-earth magnets have a high magnetic flux density compared to ferrite magnets, enabling reductions in the size and weight of the motor main body to be achieved. However, since there is a tendency for rare-earth magnets to become irreversibly demagnetized at high temperatures, reducing generated torque, for the magnets of an actuator applied to an automatic transmission apparatus, it is desirable to use rare-earth magnets in which the demagnetizing factor at high temperatures such as 130 degrees Celsius to 150 degrees Celsius, for example, is equal to or less than 15 percent.

Furthermore, it goes without saying that the rare-earth magnets used for the magnets 11 are not limited to samarium-cobalt magnets.

Moreover, Embodiment 1 above has been explained with reference to an actuator having a construction in which an operating member 22 mounted to a second end portion of a shaft 4 is operated by converting torque from a rotor 6 into a motive force in a direction of a motor central axis A to move the shaft 4 in the direction of the motor central axis A, but the present invention may also be applied to an actuator having a construction in which a rotor is fixed to a shaft, and an operating member mounted to a second end portion of an intermediate member is operated by converting torque from the shaft into a motive force in the direction of the motor central axis A to move the intermediate member in the direction of the motor central axis A. In an actuator having this construction, reductions in the size and weight of the motor main body are also enabled by using rare-earth magnets for the magnets 11.

Embodiment 2

In Embodiment 2, neodymium bonded magnets constituting rare-earth magnets are used for the magnets 11. Moreover, the rest of this embodiment is constructed in a similar manner to Embodiment 1 above.

The neodymium bonded magnets are powder-molded using a resin as a binder, being manufactured by injection molding, for example. Thus, compared to sintered magnets such as samarium-cobalt magnets, the neodymium bonded magnets are less likely to crack and high dimensional precision is achieved.

Consequently, in Embodiment 2, because the neodymium bonded magnets are used for the magnets 11, lowering of yield as a result of cracking of the magnets 11 in the process of affixing the magnets with adhesive and the assembly process is also suppressed, enabling further cost reductions.

Moreover, in each of the above embodiments, the rotor 6 is explained as being prepared by affixing the magnets 11 to an outer circumferential surface of the bush 10 using an adhesive, but the rotor 6 is not limited to this configuration and, for example, the rotor configuration may also be such that a bush and magnets are formed integrally by insert-molding the magnets 11 in a resin.

In each of the above embodiments, the guide member 20 made of the resin and the shaft 4 are explained as being prepared as separate parts, the guide member 20 being fixed to the shaft 4, but rotation-regulating projection portions may also be formed integrally on the shaft by projecting a portion of the shaft radially during a process for manufacturing the shaft.

In each of the above embodiments, the power conversion mechanism is constituted by rotation-regulating projection portions 20a disposed so as to protrude from a guide member 20 and guide grooves 12b disposed so as to extend along inner wall surfaces of the housing central aperture 12a in the direction of a motor central axis A, but a power conversion mechanism may also be constructed by forming a recess portion in the guide member 20 and disposing a guide protrusion fitting loosely into the recess portion so as to extend along the inner wall surface of the housing central aperture 12a in the direction of the motor central axis A.

In each of the above embodiments, the stator 5 and the external connector 25 are constructed integrally with the exterior casing by molding a resin, but the construction for integrating the stator 5 and the external connector 25 and the exterior casing is not limited to this and for example, the stator 5 and the external connector 25 may also be installed in a resin or metal housing (exterior casing) and integrated, or a previously integrated stator 5 and external connector 25 may also be installed in a resin or metal housing (exterior casing) and integrated. If a metal housing is used, effects are achieved that enable the heat generated in the stator to be dissipated efficiently.

What is claimed is:

1. An actuator for operating a transmission control valve of an automatic transmission apparatus, said actuator comprising:
   a stepping motor comprising:
      an exterior casing having a first end and a second end in a direction of a motor central axis;
      a motor main body composed of:
         a stator disposed inside said exterior casing; and
         a rotor rotatably disposed inside said stator around said motor central axis, said rotor being having magnets constituting magnetic poles mounted to an outer circumferential surface of a cylindrical bush, and an internal thread portion being formed on an inner peripheral wall surface of said bush; and
      a shaft having a first end and a second end, said shaft being disposed such that said second end thereof projects outward from said exterior casing at a position of said motor central axis by screwing an external thread portion formed on said first end of said shaft into said internal thread portion of said bush;
   a housing linked to said second end of said exterior casing in said direction of said motor central axis, said second end of said shaft projecting outward from said housing along said direction of said motor central axis;
   a power conversion mechanism for converting torque acting around said motor central axis of said rotor into a motive force in a direction along said motor central axis by regulating rotation of said shaft so as to move said shaft in said direction along said motor central axis; and
   an operating member mounted to a second end portion of said shaft projecting outward from said housing, said operating member being moved in said direction along said motor central axis to operate said transmission control valve,
   wherein a penetrating aperture is disposed through said first end of said exterior casing in said direction of said motor central axis so as to communicate between an interior portion of said bush and an exterior portion of said exterior casing, and a filter is disposed so as to cover said penetrating aperture from said second end of said exterior casing in said direction of said motor central axis.

2. The automatic transmission apparatus transmission control valve operating actuator according to claim 1, wherein said magnets are rare-earth magnets.

3. The automatic transmission apparatus transmission control valve operating actuator according to claim 2, wherein said rare-earth magnets are neodymium bonded magnets.

4. The automatic transmission apparatus transmission control valve operating actuator according to claim 1, wherein:
   said power conversion mechanism is provided with:
   a rotation-regulating projection portion formed so as to project radially outward on a portion of said shaft that projects outward from said exterior casing; and
   a guide groove disposed so as to extend along an inner wall surface of said housing such that a groove direction of said guide groove is aligned with said direction of said motor central axis, said rotation-regulating projection portion fitting loosely into said guide groove.

5. The automatic transmission apparatus transmission control valve operating actuator according to claim 1, wherein said operating member is formed integrally by injection molding on a tip portion of said shaft projecting outward from said housing.

* * * * *